United States Patent
Fukuoka et al.

(10) Patent No.: US 9,392,133 B2
(45) Date of Patent: Jul. 12, 2016

(54) INFORMATION PROCESSING APPARATUS AND IMAGE FORMING APPARATUS

(71) Applicant: FUJI XEROX CO., LTD., Tokyo (JP)

(72) Inventors: Takanori Fukuoka, Kanagawa (JP); Hisaji Hiramatsu, Kanagawa (JP); Yuichi Kawata, Kanagawa (JP); Kei Hatano, Kanagawa (JP); Tadamasa Sakamaki, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 14/720,108

(22) Filed: May 22, 2015

(65) Prior Publication Data

US 2016/0165085 A1   Jun. 9, 2016

(30) Foreign Application Priority Data

Dec. 8, 2014   (JP) .................................. 2014-247961

(51) Int. Cl.
| | | |
|---|---|---|
| *G06F 15/00* | (2006.01) | |
| *G06F 3/12* | (2006.01) | |
| *G06K 1/00* | (2006.01) | |
| *H04N 1/00* | (2006.01) | |
| *G06F 1/32* | (2006.01) | |
| *G06F 1/24* | (2006.01) | |

(52) U.S. Cl.
CPC .............. *H04N 1/00891* (2013.01); *G06F 1/24* (2013.01); *G06F 1/3203* (2013.01); *H04N 1/00204* (2013.01); *H04N 2201/0094* (2013.01)

(58) Field of Classification Search
USPC ................................................. 358/1.1–1.18
See application file for complete search history.

(56) References Cited

U.S. PATENT DOCUMENTS

| | | | | |
|---|---|---|---|---|
| 8,817,287 B2* | 8/2014 | Umeda | .............. | H04N 1/00238 358/1.13 |
| 8,867,063 B2* | 10/2014 | Kadota | .............. | G03G 15/5004 358/1.13 |

FOREIGN PATENT DOCUMENTS

| | | |
|---|---|---|
| JP | 4-181370 A | 6/1992 |
| JP | 5-44570 A | 2/1993 |
| JP | 11-34766 A | 2/1999 |
| JP | 2000-232540 A | 8/2000 |
| JP | 2004-5029 A | 1/2004 |
| JP | 2006-209533 A | 8/2006 |
| JP | 2007-286859 A | 11/2007 |
| JP | 2008-131603 A | 6/2008 |
| JP | 2011-034401 A | 2/2011 |
| JP | 2011-51217 A | 3/2011 |

OTHER PUBLICATIONS

Communication dated Jun. 10, 2015 from the Japanese Patent Office in counterpart application No. 2014-247961.

* cited by examiner

*Primary Examiner* — Douglas Tran
(74) *Attorney, Agent, or Firm* — Sughrue Mion, PLLC

(57) ABSTRACT

An information processing apparatus includes a first central processing unit, a second central processing unit, and a returning unit. The first central processing unit has a normal operating state and a power-saving state in which power consumption is lower than in the normal operating state. The second central processing unit causes the first central processing unit to return to the normal operating state from the power-saving state. The returning unit causes the first central processing unit to return to the normal operating state in a case where the second central processing unit enters an anomalous state after the first central processing unit has entered the power-saving state.

7 Claims, 8 Drawing Sheets

INFORMATION PROCESSING APPARATUS AND IMAGE FORMING APPARATUS

CROSS-REFERENCE TO RELATED APPLICATIONS

This application is based on and claims priority under 35 USC 119 from Japanese Patent Application No. 2014-247961 filed Dec. 8, 2014.

BACKGROUND (i) Technical Field

The present invention relates to an information processing apparatus and an image forming apparatus.

(ii) Related Art

Some information processing apparatuses such as image forming apparatuses enter the power-saving mode (standby mode) if the unused state lasts for a certain period, so as to reduce the power consumption.

For example, if an image forming apparatus receives no print job (print instruction) for a certain period, the image forming apparatus brings its first CPU into a power-off state and enters the power-saving mode. The image forming apparatus causes its second CPU to monitor a network in the power-saving mode and continues the power-saving mode until a print job is sent to the image forming apparatus.

In such an image forming apparatus, the first CPU issues an power-saving-mode transition instruction to the second CPU upon conditions for entering the power-saving mode are met. The second CPU returns, to the first CPU, a start transition response which permits entry to the power-saving mode. Upon receipt of the start transition response, the first CPU starts preparation to enter the power-saving mode.

Specifically, the first CPU prepares to enter the power-saving mode by performing processes such as storing various settings and saving data of a register.

After completing preparation to enter the power-saving mode, the first CPU sends a preparation-for-transition completion notification to the second CPU. Upon receipt of the preparation-for-transition completion notification from the first CPU, the second CPU performs processes such as setting a reset setting in the first CPU and powering off the first CPU. In this way, the image forming apparatus enters the power-saving mode.

SUMMARY

According to an aspect of the invention, there is provided an information processing apparatus including a first central processing unit, a second central processing unit, and a returning unit. The first central processing unit has a normal operating state and a power-saving state in which power consumption is lower than in the normal operating state. The second central processing unit causes the first central processing unit to return to the normal operating state from the power-saving state. The returning unit causes the first central processing unit to return to the normal operating state in a case where the second central processing unit enters an anomalous state after the first central processing unit has entered the power-saving state.

BRIEF DESCRIPTION OF THE DRAWINGS

An exemplary embodiment of the present invention will be described in detail based on the following figures, wherein.

DETAILED DESCRIPTION

Now, an exemplary embodiment of the present invention will be described in detail with reference to the accompanying drawings.

Figure 1:
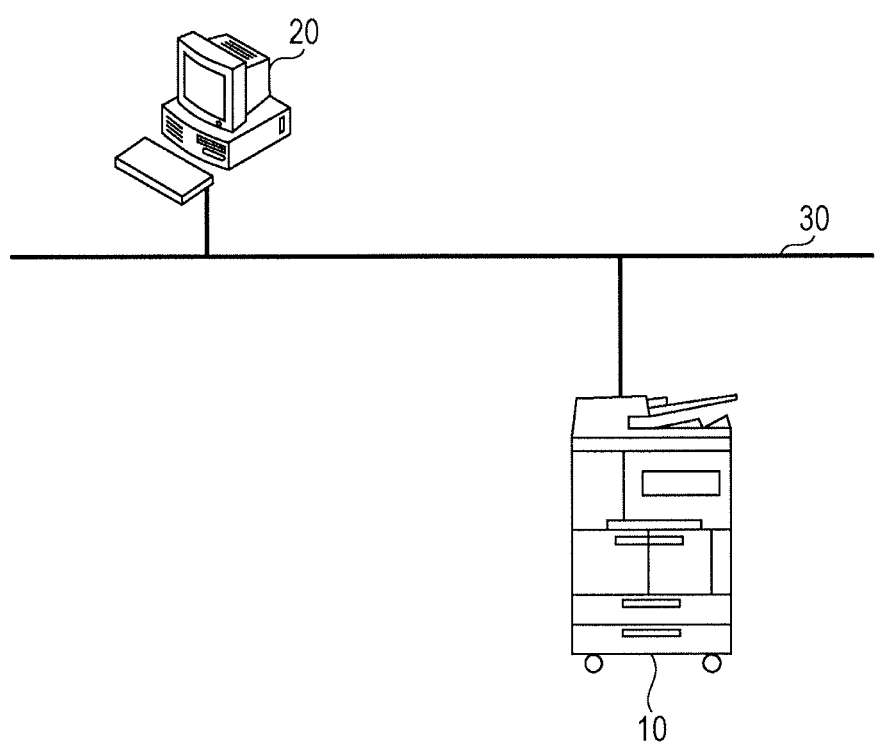
FIG. 1 illustrates a configuration of an image forming system according to an exemplary embodiment of the present invention.

FIG. 1 is a block diagram illustrating a configuration of an image forming system according to an exemplary embodiment of the present invention.

As illustrated in FIG. 1, the image forming system according to the exemplary embodiment of the present invention includes an image forming apparatus (image processing apparatus) 10 and a terminal apparatus 20 that are connected to each other via a network 30. The terminal apparatus 20 generates print data and sends the generated print data to the image forming apparatus 10 via the network 30. The image forming apparatus 10 receives the print data sent from the terminal apparatus 20 and forms an image based on the print data on a sheet. The image forming apparatus 10 is, for example, a multifunction image forming apparatus having multiple functions, such as a print function, a scan function, a copy function, and a fax function.

Figure 2:
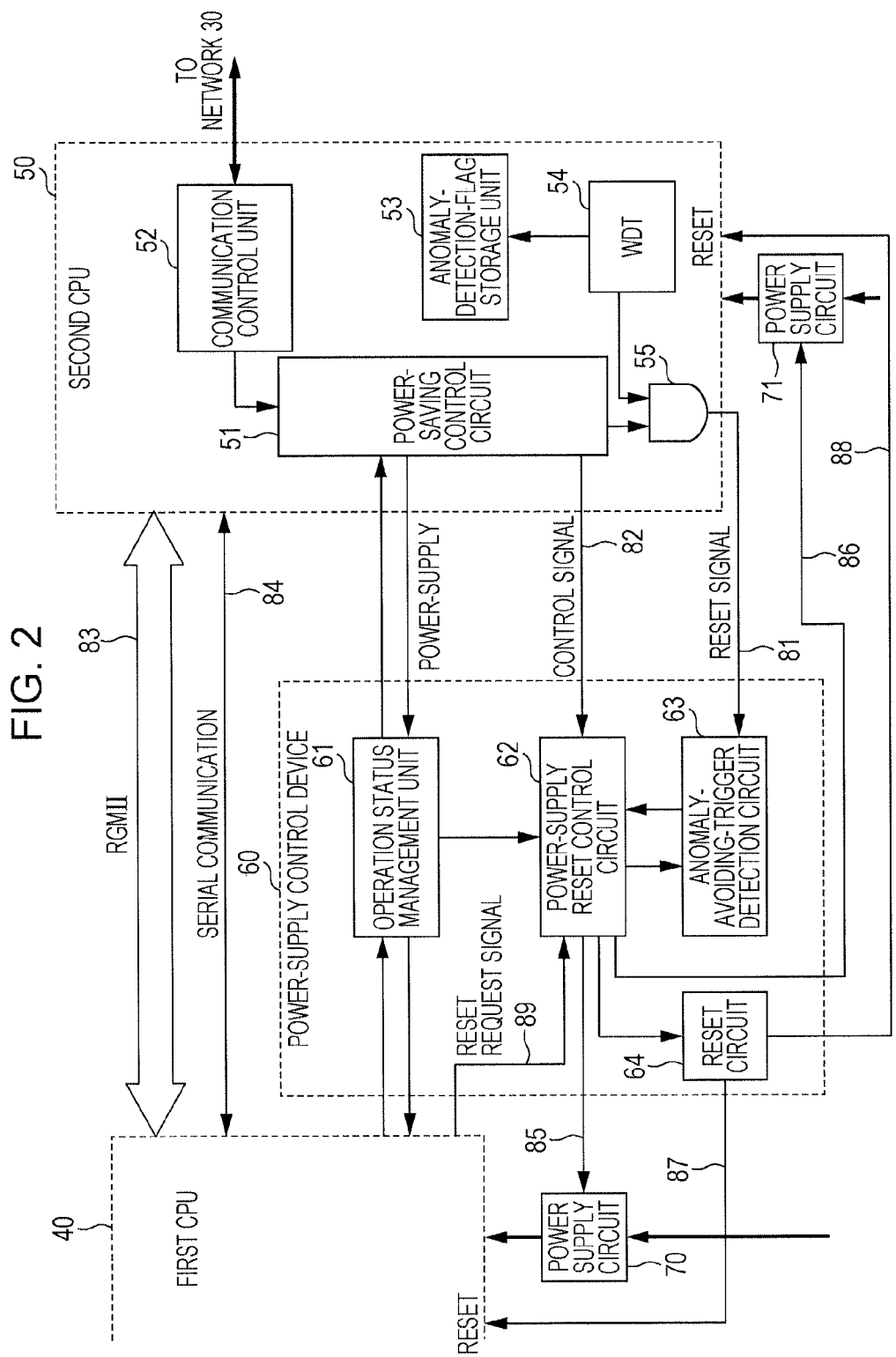
FIG. 2 illustrates a hardware configuration of an image forming apparatus according to the exemplary embodiment of the present invention.

FIG. 2 illustrates a hardware configuration of the image forming apparatus 10 of the image forming system according to the exemplary embodiment.

As illustrated in FIG. 2, the image forming apparatus 10 includes a first CPU 40, a second CPU 50, a power-supply control device 60, and power supply circuits 70 and 71.

The first CPU (first central processing unit) 40 is a CPU that controls operation of an image output unit, such as a print engine that forms an image on a recording medium, such as a print sheet. The first CPU 40 has a normal operating mode (normal operating state) and a power-saving mode (power-saving state) in which the power consumption is lower than in the normal operating mode. The first CPU 40, in the normal operating mode, controls the image output unit.

The second CPU (second central processing unit) 50 is a CPU that performs management to stop supplying the power to the first CPU 40 when the first CPU 40 enters the power-saving mode and to supply the power to the first CPU 40 when the first CPU 40 returns to the normal operating mode from the power-saving mode. That is, the second CPU 50 performs control to cause the first CPU 40 to return to the normal operating mode from the power-saving mode. The second CPU 50 also performs communication via the network 30 while the first CPU 40 is in the power-saving mode.

The first CPU 40 and the second CPU 50 are connected to each other by a reduced gigabit media independent interface (RGMII) 83. The first CPU 40 and the second CPU 50 are also connected to each other by a serial communication line 84.

The power-supply control device 60 is a device that controls power supply to the first CPU 40 and the second CPU 50.

The power supply circuit 70 supplies the power or stops supplying the power to the first CPU 40 in accordance with an instruction from the power-supply control device 60. Specifically, upon a power-off signal 85 fed from the power-supply control device 60 changing to a high level (hereinafter, referred to as "H level"), the power supply circuit 70 stops supplying the power to the first CPU. Upon the power-off signal 85 changing to a low level (hereinafter, referred to as "L level"), the power supply circuit 70 starts supplying the power to the first CPU 40.

The power supply circuit 71 supplies the power or stops supplying the power to the second CPU 50 in accordance with an instruction from the power-supply control device 60. Specifically, upon a power-off signal 86 fed from the power-supply control device 60 changing to the H level, the power supply circuit 71 stops supplying the power to the second CPU 50. Upon the power-off signal 86 changing to the L level, the power supply circuit 71 starts supplying the power to the second CPU 50.

The second CPU 50 includes a power-saving control circuit 51, a communication control unit 52, an anomaly-detection-flag storage unit 53, a watchdog timer (WDT) 54, and an AND circuit (logical AND circuit) 55.

The communication control unit 52 communicates with an external apparatus, such as the terminal apparatus 20, via the network 30. The communication control unit 52 performs control to receive a print job sent from the terminal apparatus 20, for example.

The power-saving control circuit 51 performs control to cause the image forming apparatus 10 to enter the power-saving mode and to return from the power-saving mode. In response to a power-saving-mode transition request received from the first CPU 40 via the power-supply control device 60, the power-saving control circuit 51 performs control to cause the image forming apparatus 10 to enter the power-saving mode. In response to a trigger, such as the communication control unit 52 receiving a print job, the power-saving control circuit 51 performs control to cause the image forming apparatus 10 to return to the normal operating mode from the power-saving mode. The term "power-saving mode" refers to an operation mode in which power supply to an apparatus is partially or entirely stopped.

The anomaly-detection-flag storage unit 53 stores an anomaly detection flag which indicates that the WDT 54 has operated. Hereinafter, the anomaly detection flag stored in the anomaly-detection-flag storage unit 53 is simply referred to as the anomaly detection flag 53.

The WDT (anomaly avoiding timer) 54 is an anomaly detection unit that detects that the second CPU 50 has entered an anomalous state and outputs a reset pulse signal. Specifically, the WDT 54 times out and outputs the reset pulse signal, if the anomalous state of the second CPU 50 lasts for a certain period.

The anomalous state refers to a state in which the second CPU 50 is uncontrollable because an internal program counter has pointed to an unintended address or in which the second CPU 50 does not respond to an interruption, for example.

The AND circuit 55 performs a logical AND operation on the reset signal (reset instruction) output from the power-saving control circuit 51 and the reset pulse signal output from the WDT 54 and outputs the result as a reset signal 81 to the power-supply control device 60.

Both the reset signal output from the power-saving control circuit 51 and the reset pulse signal output from the WDT 54 are active-low signals. Accordingly, the reset signal is output to the power-supply control device 60 when it is output from the power-saving control circuit 51 and the reset pulse signal is output to the power-supply control device 60 when it is output from the WDT 54.

The power-supply control device 60 includes an operation status management unit 61, a power-supply reset control circuit 62, an anomaly-avoiding-trigger detection circuit 63, and a reset circuit 64.

The reset circuit 64 controls output of a reset signal 87 for resetting the first CPU 40 and output of a reset signal 88 for resetting the second CPU 50, in accordance with a signal output from the power-supply reset control circuit 62.

The operation status management unit 61 receives a power-saving-mode transition notification which requests entry to the power-saving mode and a preparation-for-transition completion notification which indicates completion of preparation to enter the power-saving mode from the first CPU 40 and transfers these notifications to the power-saving control circuit 51 of the second CPU 50. The operation status management unit 61 also receives a start transition response which permits entry to the power-saving mode from the power-saving control circuit 51 and transfers the start transition response to the first CPU 40.

The operation status management unit 61 relays communication between the first CPU 40 and the second CPU 50, thereby grasping the operation mode of the image forming apparatus 10. Specifically, upon receipt of a preparation-for-transition completion notification from the first CPU 40, the operation status management unit 61 determines that the image forming apparatus 10 has entered the power-saving mode.

Upon receipt of a power-supply control signal 82 from the power-saving control circuit 51, the power-supply reset control circuit 62 controls power supply to various circuit elements of the image forming apparatus 10, such as the first CPU 40 and the second CPU 50, and resetting of the circuit elements. The power-supply reset control circuit 62 performs such a control by using the power-off signals 85 and 86 respectively output to the power supply circuits 70 and 71 and a signal output to the reset circuit 64, in accordance with the current operation mode managed by the operation status management unit 61. Details about the operation of the power-supply reset control circuit 62 will be described later.

Components such as the power-supply control device 60 and the WDT 54 serve as a returning unit that causes the first CPU 40 to return to the normal operating mode in the case where the second CPU 50 enters an anomalous state after the first CPU 40 has entered the power-saving mode.

A configuration of the anomaly-avoiding-trigger detection circuit 63 illustrated in FIG. 2 will be described with reference to FIG. 3.

Figure 3:
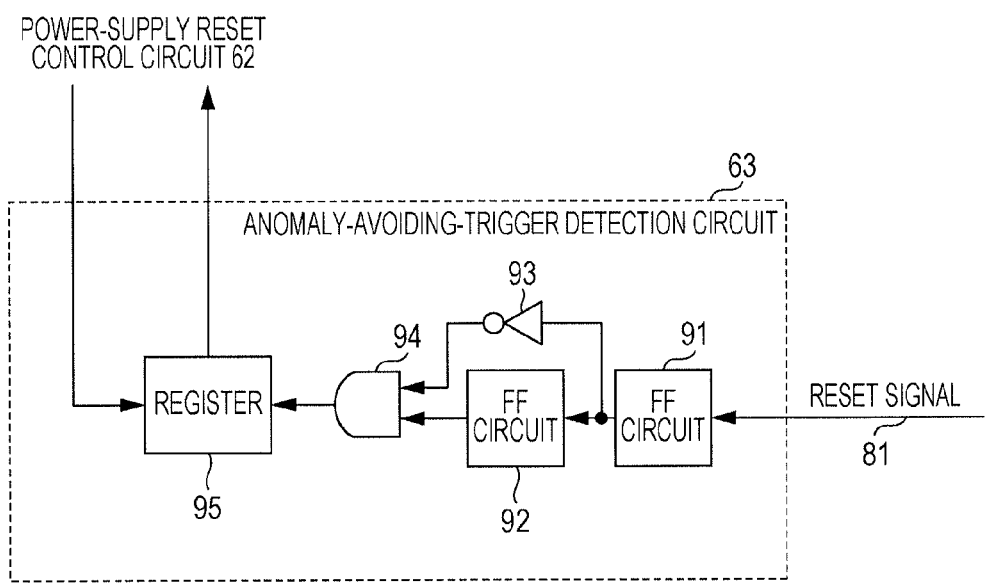
FIG. 3 illustrates a configuration of an anomaly-avoiding-trigger detection circuit illustrated in FIG. 2.

As illustrated in FIG. 3, the anomaly-avoiding-trigger detection circuit 63 includes flip-flop (FF) circuits 91 and 92, an inverting circuit 93, an AND circuit 94, and a register 95.

The FF circuit 91 outputs a logic of the reset signal 81 in accordance with a clock signal input thereto, after holding the logic of the reset signal 81. The FF circuit 92 outputs the output logic of the FF circuit 91 after holding the output logic. The inverting circuit 93 inverts the output logic of the FF circuit 91 and outputs the inverted logic.

The AND circuit 94 performs a logical AND operation on the output of the inverting circuit 93 and the output of the FF circuit 92 and outputs the result.

The FF circuits 91 and 92, the inverting circuit 93, and the AND circuit 94 serve as a falling-edge detection circuit that detects a falling edge of the reset signal 81 and outputs a pulse signal.

The register 95 stores, as a reset flag, the pulse signal output from the AND circuit 94. That is, the register 95 functions as a memory that stores a reset flag which becomes active in response to output of the reset pulse signal from the WDT 54 or output of a reset signal, which indicates an instruction to reset the first CPU 40, from the second CPU 50.

The falling-edge detection circuit detects a falling edge of the reset signal output from the power-saving control circuit 51 or the reset pulse signal output from the WDT 54 of the second CPU 50 and stores a result of the detection as the reset flag in the register (memory) 95.

The reset flag stored in the register 95 is cleared and becomes inactive in accordance with control by the power-supply reset control circuit 62. The power-supply reset control circuit 62 performs an operation for clearing the register 95 after powering on the first CPU 40 and cancelling the reset state in response to the power-supply control signal 82 fed from the power-saving control circuit 51 changing to the H level.

If the reset flag stored in the register 95 becomes active after the first CPU 40 has completed preparation to enter the power-saving mode, the power-supply reset control circuit 62 brings the first CPU 40 into a power-off state. In response to an instruction to supply the power to the first CPU 40, which is given as a result of the second CPU 50 outputting the power-supply control signal 82, the power-supply reset control circuit 62 performs control to restart supplying the power to the first CPU 40.

After returning to the normal operating state from the power-off state, the first CPU 40 checks the anomaly detection flag 53 of the second CPU 50 via the serial communication line 84. If the anomaly detection flag 53 indicates that the WDT 54 has operated, the first CPU 40 instructs the power-supply control device 60 to reboot the entire image forming apparatus 10 including the second CPU 50 as well as the first CPU 40 by using a reset request signal 89.

In the exemplary embodiment, the power-supply reset control circuit 62 brings the first CPU 40 into the power-off state only in the case where the reset flag stored in the register 95 becomes active after the first CPU 40 has completed preparation to enter the power-saving state because of the following reason. If the first CPU 40 is powered off every time an anomaly occurs in the second CPU 50 and the WDT 54 operates to output the reset pulse signal, the first CPU 40 is powered off without a process such as storing content of the memory of the first CPU 40 and saving data of the register. This may cause an unwanted consequence in which the first CPU 40 is no longer rebooted.

Accordingly, the power-supply reset control circuit 62 does not stop supplying the power to the first CPU 40 even if the WDT 54 operates, while the first CPU 40 is in the normal operating mode.

Now, operations of the first CPU 40, the second CPU 50, and the power-supply control device 60 of the image forming apparatus 10 according to the exemplary embodiment will be described in detail with reference to the drawings.

Figure 4:
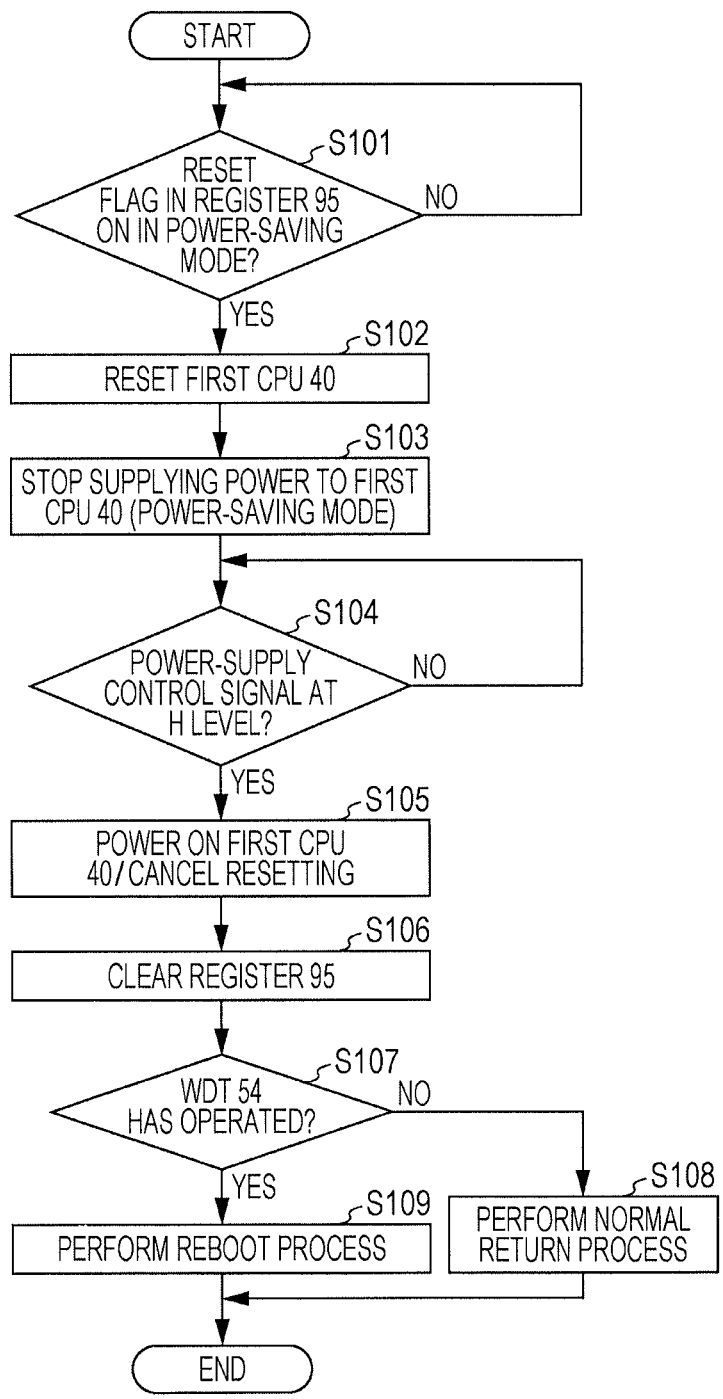
FIG. 4 is a flowchart describing an operation of a power-supply control device.

An operation of the power-supply control device 60 will be described first with reference to a flowchart of FIG. 4.

Upon being notified that the operation mode has changed from the normal operating mode to the power-saving mode by the operation status management unit 61, the power-supply reset control circuit 62 of the power-supply control device 60 checks the reset flag stored in the register 95. If the reset flag is on (YES in step S101), the power-supply reset control circuit 62 controls the reset circuit 64 to output the reset signal 87 and brings the first CPU 40 into a reset state (step S102).

The power-supply reset control circuit 62 then changes the power-off signal 85 to the H level so as to stop power supply from the power supply circuit 70 to the first CPU 40 (step S103). Consequently, the image forming apparatus 10 enters the power-saving mode, and the power consumption becomes lower than in the normal operating mode.

The power-saving mode is continued until the power-supply control signal 82 changes to the H level. Upon the power-supply control signal 82 changing to the H level (YES in step S104), the power-supply reset control circuit 62 changes the power-off signal 85 to the L level so as to brings the first CPU 40 into a power-on state and controls the reset circuit 64 to make the reset signal 87 output to the first CPU 40 have a reset cancelled state (step S105).

The power-supply reset control circuit 62 then clears the reset flag stored in the register 95 of the anomaly-avoiding-trigger detection circuit 63 (step S106).

Then, the first CPU 40 returns to the normal operating state from the power-off state, checks the anomaly detection flag 53 of the second CPU 50 via the serial communication line 84, and determines whether the WDT 54 has operated (step S107). If the anomaly detection flag 53 indicates that the WDT 54 has operated (YES in step S107), the first CPU 40 outputs the reset request signal 89 to the power-supply reset control circuit 62 to perform a reboot process (step S109).

The reboot process is a process for rebooting the entire image forming apparatus 10 including the first CPU 40 and the second CPU 50. Accordingly, even if some kind of anomaly has occurred in the second CPU 50 and the second CPU 50 is in the anomalous state, the reboot process allows the second CPU 50 to return to the normal operating state. Note that the anomaly detection flag 53 is cleared as a result of rebooting of the second CPU 50.

If the anomaly detection flag 53 indicates that the WDT 54 has not operated (NO in step S107), the first CPU 40 performs a normal return process (step S108).

Now, operations of the first CPU 40, the second CPU 50, and the power-supply control device 60 performed when the first CPU 40 enters the power-saving mode will be described regarding the case of normal operation and the case of anomalous operation.

A description will be given of operations performed when the first CPU 40 enters the power-saving mode while the first CPU 40 and the second CPU 50 are operating normally.

Figure 5:
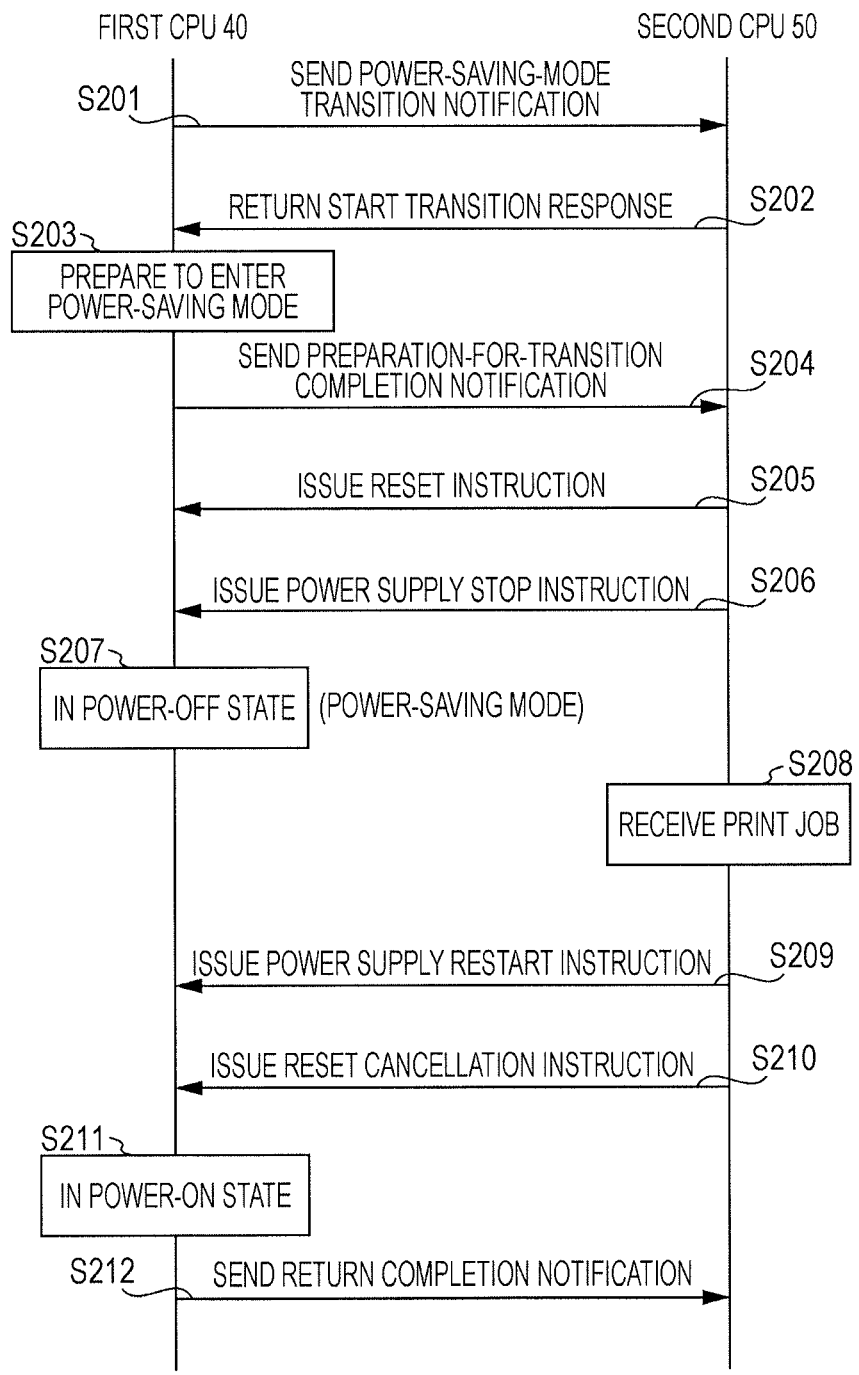
FIG. 5 is a sequence chart describing operations of a first CPU and a second CPU during normal operation.

FIG. 5 is a sequence chart describing operations of the first CPU 40 and the second CPU 50 during normal operation. Changes in the reset signal 81 and the power-supply control signal 82 during normal operation are illustrated in a timing chart of FIG. 6.

To enter the power-saving mode, the first CPU 40 sends a power-saving-mode transition notification to the second CPU 50 via the operation status management unit 61 (step S201). The second CPU 50 then returns a start transition response which permits entry to the power-saving mode to the first CPU 40 via the operation status management unit 61 (step S202).

Upon receipt of the start transition response from the second CPU 50, the first CPU 40 performs preparation to enter the power-saving mode, such as saving content of the register (step S203).

After completing preparation to enter the power-saving mode, the first CPU 40 sends a preparation-for-transition completion notification to the second CPU 50 via the operation status management unit 61 to notify the second CPU 50 of the completion of preparation (step S204). At this time, the operation status management unit 61 recognizes that the operation mode has changed to the power-saving mode.

Upon receipt of the preparation-for-transition completion notification, the second CPU 50 determines that the first CPU 40 has completed preparation to enter the power-saving mode. The power-saving control circuit 51 then outputs the reset signal to issue a reset instruction (step S205) and changes the power-supply control signal 82 to the L level to issue a power supply stop instruction (step S206).

Figure 6:
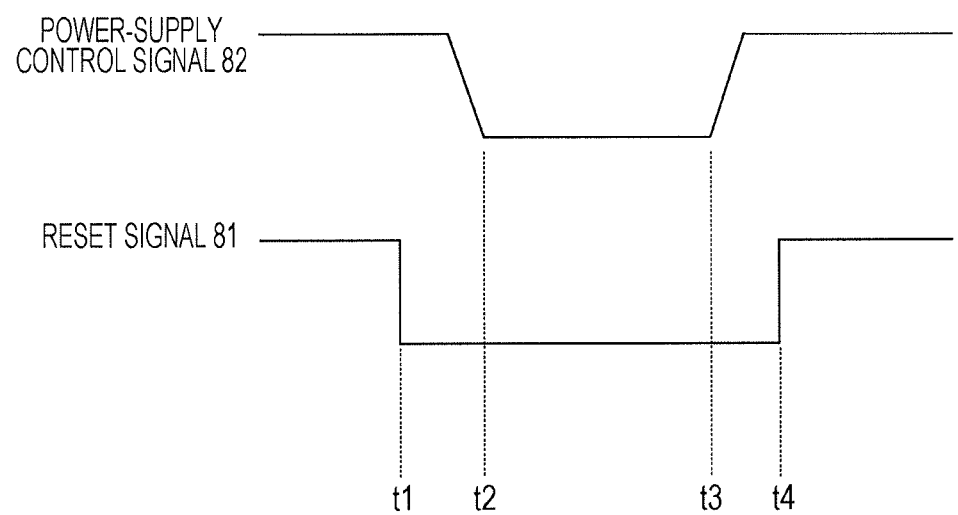
FIG. 6 is a timing chart illustrating changes in a reset signal and a power-supply control signal during normal operation.

Accordingly, the reset signal 81 changes to the L level at time t1 and the power-supply control signal 82 changes to the L level at time t2 as illustrated in FIG. 6.

As a result of the reset signal 81 becoming the L level at time t1, the reset flag stored in the register 95 of the anomaly-avoiding-trigger detection circuit 63 becomes active.

At this time, the operation mode managed by the operation status management unit 61 is the power-saving mode and the reset flag stored in the register 95 is active. Accordingly, the power-supply reset control circuit 62 causes power supply to the first CPU 40 to be stopped and brings the first CPU 40 into a reset state.

As a result, the first CPU 40 enters the power-off state (step S207), and the image forming apparatus 10 enters the power-saving mode.

If the communication control unit 52 of the second CPU 50 receives a print job via the network 30 (step S208), the power-saving control circuit 51 changes the power-supply control signal 82 to the H level to issue a power supply restart instruction (step S209). The power-saving control circuit 51 then changes the reset signal to the H level to issue a reset cancellation instruction (step S210).

Accordingly, the power-supply control signal 82 changes to the H level at time t3, and the reset signal 81 changes to the H level at time t4 as illustrated in FIG. 6.

As a result of the power-supply control signal 82 becoming the H level, the power-supply reset control circuit 62 brings the first CPU 40 into the power-on state and then into the reset cancelled state. Consequently, the first CPU 40 enters the power-on state (step S211) and sends a return completion notification to the second CPU 50 (step S212).

Now, a description will be given of an operation performed in the case where an anomaly occurs in the second CPU 50 during a process to enter the power-saving mode.

Figure 7:
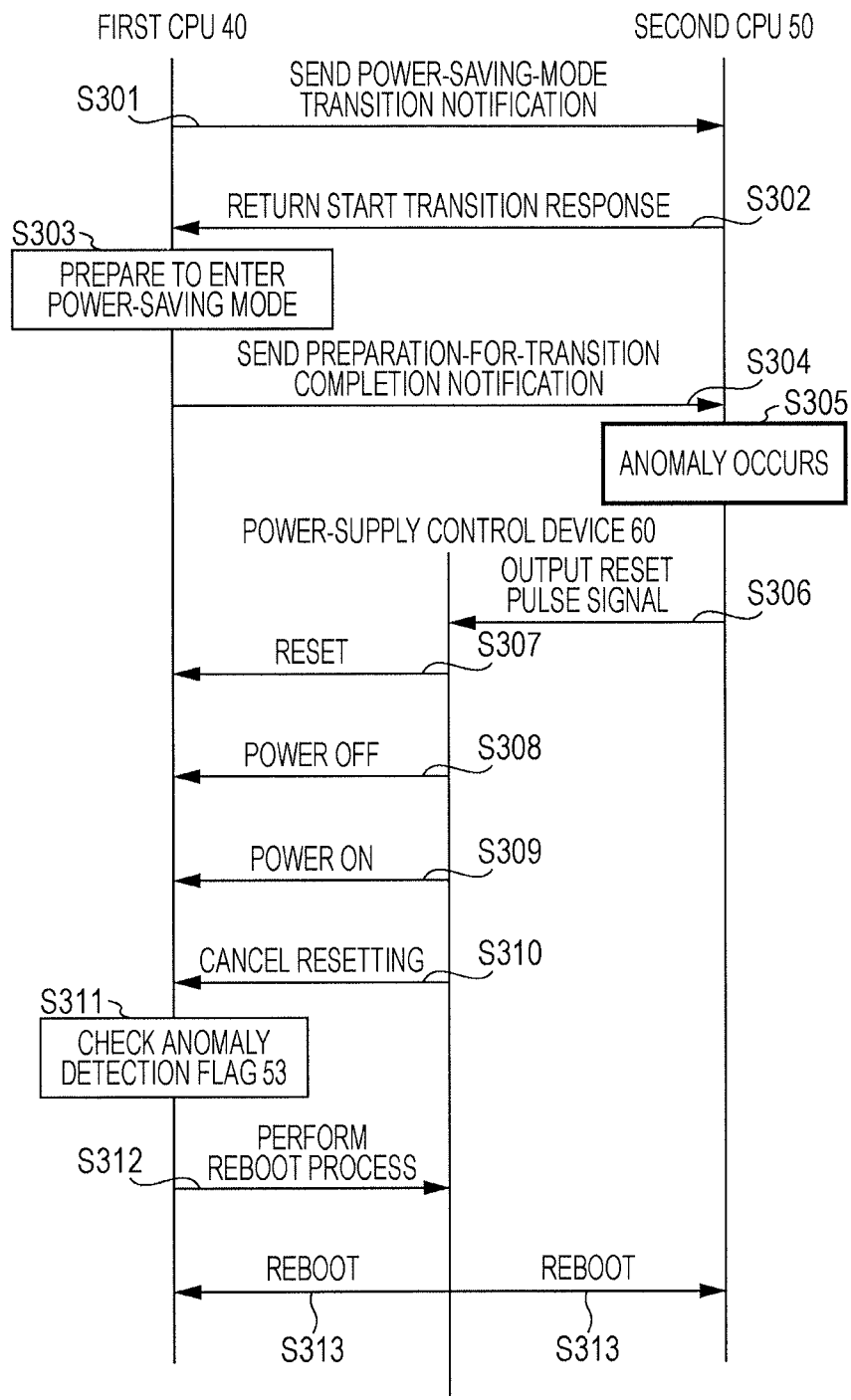
FIG. 7 is a sequence chart describing operations of the first CPU, the second CPU, and the power-supply control device in the event of an anomaly of the second CPU.

FIG. 7 is a sequence chart describing operations of the first CPU 40, the second CPU 50, and the power-supply control device 60 performed in the event of an anomaly of the second CPU 50. Changes in the reset signal 81, the power-supply control signal 82, and the power-off signal 85 in the event of an anomaly of the second CPU 50 are illustrated in a timing chart of FIG. 8.

Processing of steps S301 to S304 illustrated in the flowchart of FIG. 7 is similar to processing of steps S201 to S204 illustrated in the flowchart of FIG. 5, and thus a description thereof is omitted.

Referring to the flowchart of FIG. 7, some kind of anomaly occurs in the second CPU 50 (step S305) after the first CPU 40 has sent a preparation-for-transition completion notification to the second CPU 50 (step S304).

Accordingly, the WDT 54 of the second CPU 50 operates, and consequently the reset signal 81 is output to the anomaly-avoiding-trigger detection circuit 63 (step S306). The anomaly detection flag 53 is set to a state indicating that an anomaly has occurred in the second CPU 50.

Figure 8:
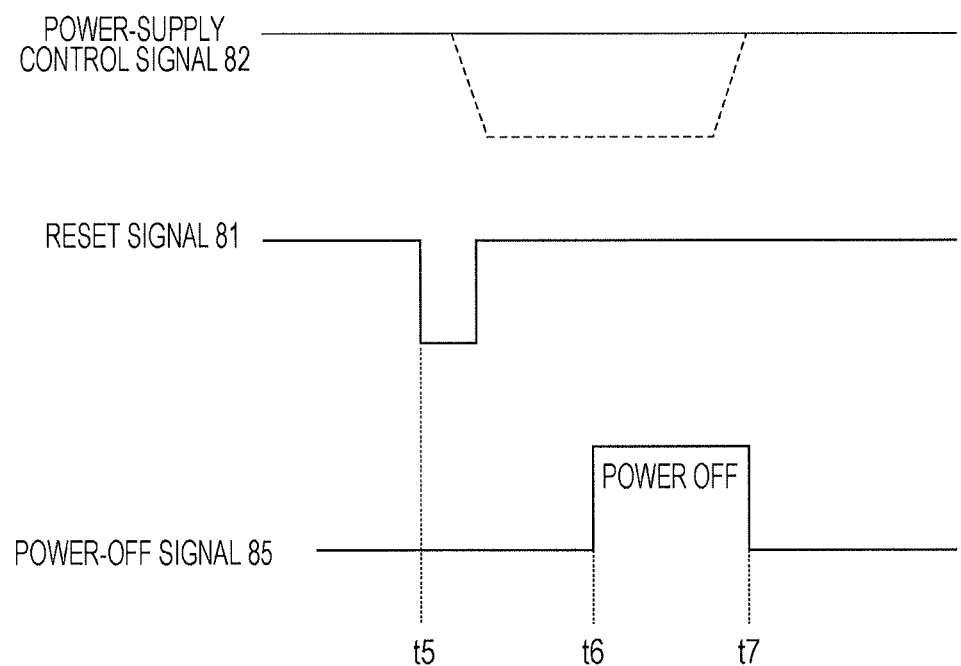
FIG. 8 is a timing chart illustrating changes in the reset signal, the power-supply control signal, and a power-off signal in the event of an anomaly of the second CPU.

Accordingly, at time t5, the reset signal 81 is output which is maintained at the L level for a certain period, as illustrated in the timing chart of FIG. 8. Referring to FIG. 8, the power-supply control signal 82 is maintained at the H level, unlike the change during the normal operation which is indicated by a dashed line.

As a result, the reset flag stored in the register 95 of the anomaly-avoiding-trigger detection circuit 63 becomes active. Thus, the power-supply reset control circuit 62 brings the first CPU 40 into the reset state (step S307) and changes the power-off signal 85 to the H level to bring the first CPU 40 into the power-off state (step S308).

The power-supply control signal 82 is maintained at the H level as a result of an anomaly that has occurred in the second CPU 50. Thus, the power-supply reset control circuit 62 changes the power-off signal 85 to the L level to bring the first CPU 40 into the power-on state (step S309) and then cancels the reset state of the first CPU 40 (step S310).

During such a control, the power-off signal 85 changes to the H level at time t6 and then returns to the L level at time t7, as illustrated in the timing chart of FIG. 8.

Consequently, the first CPU 40 returns to the normal operating state from the power-off state and checks the anomaly detection flag 53 of the second CPU 50 (step S311).

In this case, an anomaly has occurred in the second CPU 50 and the WDT 54 has operated. Accordingly, the anomaly detection flag 53 indicates that the WDT 54 has operated. Thus, the first CPU 40 outputs the reset request signal 89 to the power-supply reset control circuit 62 to perform a reboot process (step S312).

The power-supply reset control circuit 62 then performs control to reboot the first CPU 40 and the second CPU 50 (step S313).

In the case where an anomaly occurs in the second CPU 50 before the first CPU 40 receives a start transition response and performs preparation to enter the power-saving mode, the first CPU 40 detects occurrence of the anomaly in the second CPU 50 because the start transition response is not sent from the second CPU 50. In this way, the first CPU 40 is able to reboot the second CPU 50.

MODIFICATIONS

In the exemplary embodiment above, the case of applying the exemplary embodiment to an image forming apparatus has been described; however, the application target of the exemplary embodiment is not limited to the image forming apparatus, and the exemplary embodiment is similarly applicable to any information processing apparatus in which a first CPU enters a power-off state and a second CPU alone is operating in the power-saving mode.

In the exemplary embodiment above, the case where the second CPU 50 includes the WDT 54 has been described; however, the configuration of the exemplary embodiment is not limited to this one, and the exemplary embodiment is similarly applicable to the case where the WDT 54 is provided outside the second CPU 50.

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus comprising:
   a first central processing unit having a normal operating state and a power-saving state in which power consumption is lower than in the normal operating state;
   a second central processing unit that causes the first central processing unit to return to the normal operating state from the power-saving state; and
   a returning unit that causes the first central processing unit to return to the normal operating state in a case where the second central processing unit enters an anomalous state after the first central processing unit has entered the power-saving state.

2. The information processing apparatus according to claim 1, wherein the second central processing unit performs communication via a network while the first central processing unit is in the power-saving state.

3. An information processing apparatus comprising:
   a first central processing unit that controls operation of an apparatus;
   a second central processing unit that manages power supply to the first central processing unit when the first central processing unit enters a power-saving state and when the first central processing unit returns from the power-saving state;
   an anomaly detection unit that detects that the second central processing unit has entered an anomalous state and outputs a reset pulse signal; and
   a power-supply control device that controls power supply to the first central processing unit and the second central processing unit, wherein
   the second central processing unit stores an anomaly detection flag which indicates that the anomaly detection unit has operated,
   the power-supply control device includes
      a memory that stores a reset flag which becomes active in response to output of the reset pulse signal from the anomaly detection unit or output of a reset signal from the second central processing unit, the reset signal indicating an instruction to reset the first central processing unit, and
      a power-supply reset controller that brings the first central processing unit into a power-off state in a case where the reset flag stored in the memory becomes active after the first central processing unit has completed preparation to enter the power-saving state and that restarts power supply to the first central processing unit in response to an instruction, from the second central processing unit, to supply power to the first central processing unit, and
   the first central processing unit instructs the power-supply control device to reboot the second central processing unit in a case where the anomaly detection flag indicates that the anomaly detection unit has operated, after the first central processing unit has returned from the power-off state.

4. The information processing apparatus according to claim 3, wherein the power-supply control device further includes
   a falling-edge detection circuit that detects a falling edge of the reset signal output from the second central processing unit or the reset pulse signal output from the anomaly detection unit and that stores a result of the detection as the reset flag in the memory.

5. The information processing apparatus according to claim 3, wherein the anomaly detection unit is an anomaly avoiding timer that times out and outputs the reset pulse signal, if the anomalous state of the second central processing unit lasts for a certain period.

6. The information processing apparatus according to claim 4, wherein the anomaly detection unit is an anomaly avoiding timer that times out and outputs the reset pulse signal, if the anomalous state of the second central processing unit lasts for a certain period.

7. An image forming apparatus comprising:
   an image output unit that forms an image on a recording medium;
   a first central processing unit that controls operation of the image output unit;
   a second central processing unit that manages power supply to the first central processing unit when the first central processing unit enters a power-saving state and when the first central processing unit returns from the power-saving state;
   an anomaly detection unit that detects that the second central processing unit has entered an anomalous state and outputs a reset pulse signal; and
   a power-supply control device that controls power supply to the first central processing unit and the second central processing unit, wherein
   the second central processing unit stores an anomaly detection flag which indicates that the anomaly detection unit has operated,
   the power-supply control device includes
      a memory that stores a reset flag which becomes active in response to output of the reset pulse signal from the anomaly detection unit or output of a reset signal from the second central processing unit, the reset signal indicating an instruction to reset the first central processing unit, and
      a power-supply reset controller that brings the first central processing unit into a power-off state in a case where the reset flag stored in the memory becomes active after the first central processing unit has completed preparation to enter the power-saving state and that restarts power supply to the first central processing unit in response to an instruction, from the second central processing unit, to supply power to the first central processing unit, and
   the first central processing unit instructs the power-supply control device to reboot the second central processing unit in a case where the anomaly detection flag indicates that the anomaly detection unit has operated, after the first central processing unit has returned from the power-off state.

* * * * *